(12) United States Patent
Banks et al.

(10) Patent No.: US 7,400,892 B1
(45) Date of Patent: Jul. 15, 2008

(54) SYSTEM AND METHOD FOR TRACKING THE RELATIVE LOCATION OF MOBILE STATIONS BELONGING TO A PRE-DEFINED GROUP OF MOBILE STATIONS

(75) Inventors: Diane Banks, Basking Ridge, NJ (US); Pradeep K. Bansal, Monmouth Junction, NJ (US); Charles Douglas Blewett, Madison, NJ (US); Timothy A. Rock, Howell, NJ (US); Kenneth H. Rosen, Middletown, NJ (US)

(73) Assignee: AT&T Corp., New York, NY (US)

( * ) Notice: Subject to any disclaimer, the term of this patent is extended or adjusted under 35 U.S.C. 154(b) by 497 days.

(21) Appl. No.: 11/216,833

(22) Filed: Aug. 31, 2005

Related U.S. Application Data

(63) Continuation of application No. 10/029,247, filed on Dec. 28, 2001, now Pat. No. 6,975,873.

(51) Int. Cl.
*H04Q 7/20* (2006.01)
(52) U.S. Cl. .................. 455/456.5; 455/456.1; 455/457; 701/214; 701/300; 707/100
(58) Field of Classification Search .............. 455/456.5, 455/456.1, 457; 701/214, 300; 707/100
See application file for complete search history.

(56) References Cited

U.S. PATENT DOCUMENTS

| | | | |
|---|---|---|---|
| 2002/0086676 A1* | 7/2002 | Hendrey et al. | 455/445 |
| 2002/0107008 A1* | 8/2002 | Hendrey et al. | 455/416 |
| 2003/0013456 A1* | 1/2003 | Bates et al. | 455/456 |
| 2003/0078042 A1* | 4/2003 | Miriyala et al. | 455/435 |
| 2003/0100326 A1* | 5/2003 | Grube et al. | 455/515 |

* cited by examiner

*Primary Examiner*—Danh C Le

(57) ABSTRACT

Embodiments of the present invention are related to a method and apparatus for determining whether each mobile station in a pre-defined group of two or more mobile stations is in compliance with acceptable location criteria. A group tracking server receives mobile station tracking information including a mobile station identifier for each mobile station. The server also receives current location coordinates corresponding to the mobile station identifier for each mobile station from a locator device. A relative location of each mobile station relative to one or more predetermined targets the calculated. The acceptable location criteria for each mobile station relative to the one or more pre-determined targets is retrieved from a location criteria database. The calculated relative location of each mobile station relative to the one or more pre-determined targets compared with the retrieved location criteria to determine whether the calculated relative location is in compliance with the acceptable location criteria. A subscriber is then notified if the calculated relative location is in compliance with the acceptable location criteria.

14 Claims, 3 Drawing Sheets

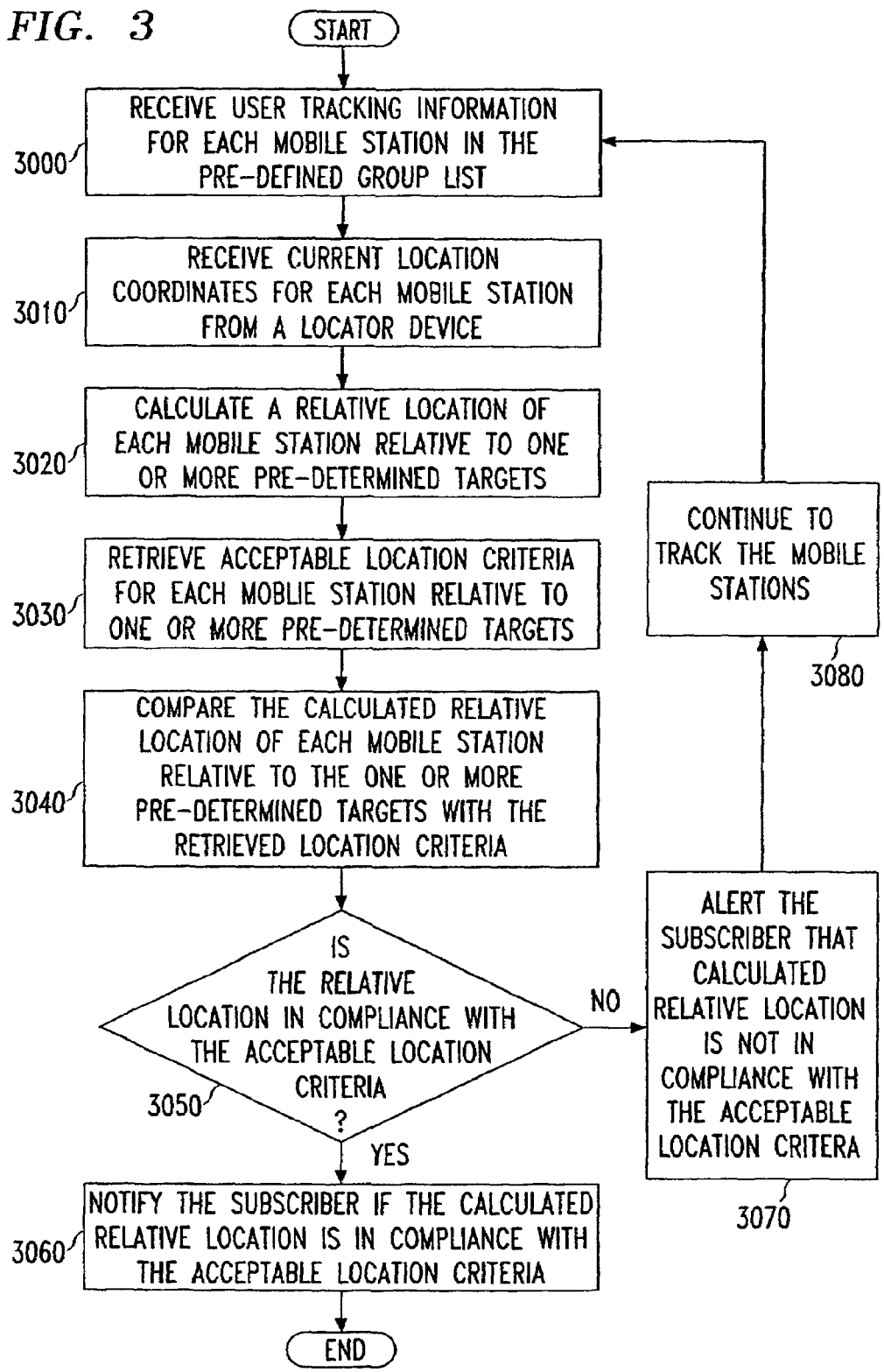

SYSTEM AND METHOD FOR TRACKING THE RELATIVE LOCATION OF MOBILE STATIONS BELONGING TO A PRE-DEFINED GROUP OF MOBILE STATIONS

CROSS-REFERENCE TO A RELATED PATENT APPLICATION

This application is a continuation and claims the benefit of U.S. application Ser. No. 10/029,247, filed on Dec. 28, 2001 now U.S. Pat. No. 6,975,873, and is related to commonly assigned copending U.S. application Ser. No. 10/029,328, filed on Dec. 28, 2001, having at least one common inventor, the entire text of which is hereby incorporated by reference.

TECHNICAL FIELD

The present invention relates generally to the field of communications. More specifically, the present invention relates to systems and methods for tracking, maintaining and/or processing the relative geographical location of a plurality of mobile stations in a pre-defined group.

BACKGROUND OF THE INVENTION

Mobile station location technologies are known. Mobile station location services can track the geographical location/coordinates of any wireless digital communication device, referred to herein as a mobile station. A mobile station equipped with Global Positioning Systems (GPS) technology typically can be located using satellites that blanket the earth in a geo-synchronous orbit for this purpose.

Moreover, existing infrastructure and/or technologies can permit mobile stations, operating in standard wireless networks (e.g., digital, analog, TDMA, CDMA, etc.), to be located geographically. Known techniques such as Angle of Arrival (AOA), Time Difference of Arrival (TDOA), location pattern matching or hybrids thereof can be used to locate a wireless caller. The TDOA, AOA and location pattern matching methods are network-based, while the GPS method is handset-based.

Mobile station location technologies are currently used, for example, to locate individual users and/or the location of the user's mobile station. The determined geographical location can then be used to provide users with services, such as dynamic routing, personal navigation, location-dependent directory information, location-dependent billing, etc. Current uses of mobile station location technologies focus on providing services on an individual basis.

SUMMARY OF THE INVENTION

Embodiments of the present invention are related to a method and apparatus for determining whether each mobile station in a pre-defined group including two or more mobile stations is in compliance with acceptable location criteria. Mobile station tracking information including a mobile station identifier for each mobile station in the pre-defined group are received. Current location coordinates corresponding to the mobile station identifier for each mobile station from a locator device may also be received. A relative location of each mobile station relative to one or more pre-determined targets is calculated. The acceptable location criteria for each mobile station relative to the one or more pre-determined targets is retrieved from a location criteria database. The calculated relative location of each mobile station, relative to the one or more pre-determined targets, is compared with the retrieved location criteria to determine whether the calculated relative location is in compliance with the acceptable location criteria. A subscriber may be notified if the calculated relative location is in compliance with the acceptable location criteria.

BRIEF DESCRIPTION OF THE DRAWINGS

Embodiments of the present invention are illustrated by way of example, and not limitation, in the accompanying figures in which like references denote similar elements, and in which:

FIG. 3 is flowchart showing a group-tracking method in accordance with an exemplary embodiment of the present invention.

DETAILED DESCRIPTION

Figure 1:
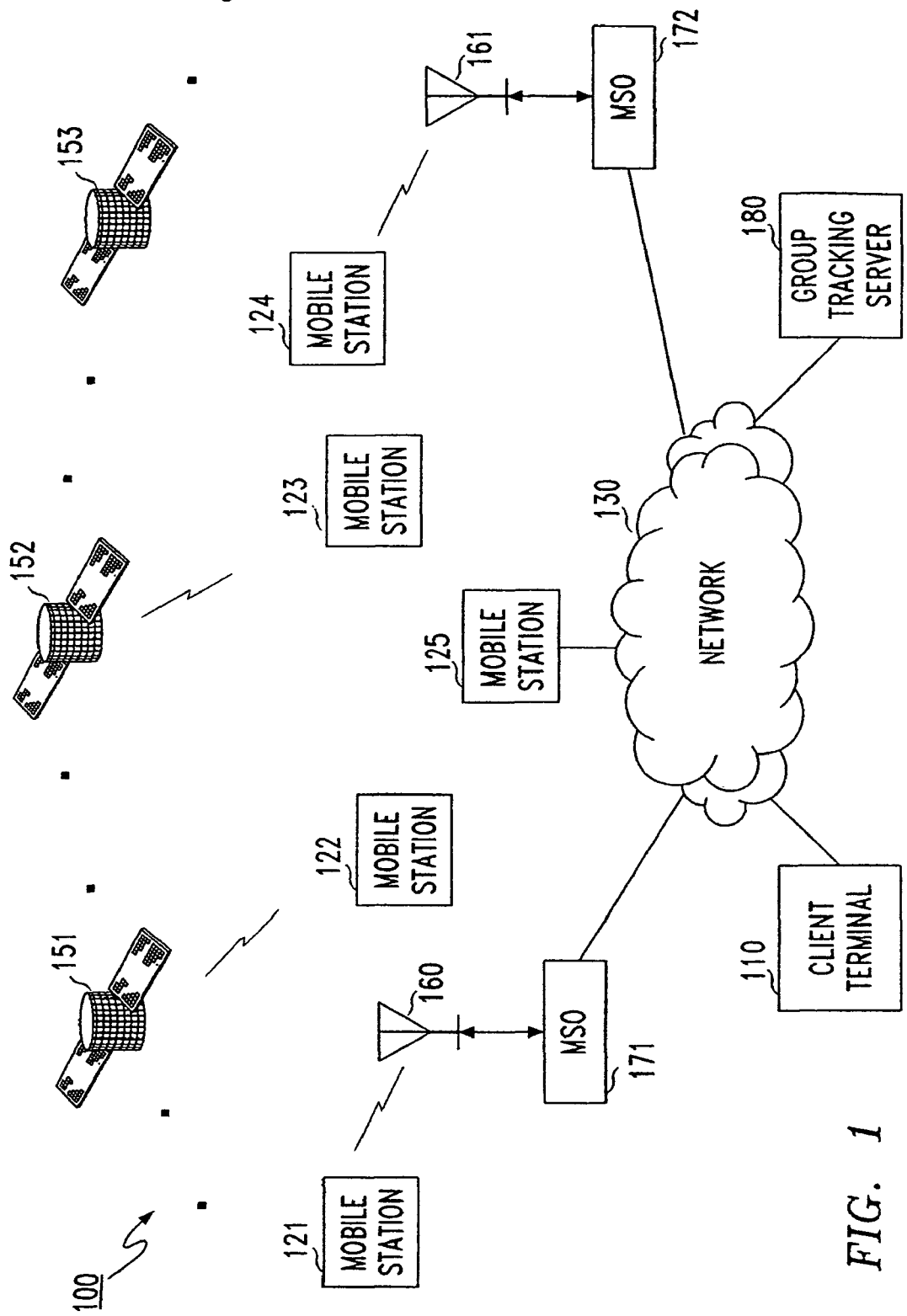
FIG. 1 is a block diagram of a group-tracking system in accordance with an embodiment of the present invention.

Embodiments of the present invention relate to systems and methods for tracking, maintaining or processing relative geographical locations of a plurality of mobile stations included in a pre-defined group. A user's location relative to other members in a pre-defined group may be employed, for example, to ensure that a sufficient number of members exist in a particular area, to gather and/or alert members to participate in a group conference call and/or for any such purpose. FIG. 1 is a block diagram of a group-tracking system 100 according to an exemplary embodiment of the present invention.

Referring to FIG. 1, group-tracking system 100 shows a group-tracking device or server 180 that may track, maintain and/or process the relative geographic location of a plurality of mobile stations identified in a pre-defined group. It is understood that the location of a mobile station is also referred to herein as the location of the mobile station's user. The group-tracking server 180 is coupled to transit network 130.

In embodiments of the present invention, group-tracking server 180 may receive location information for one or more mobile stations 121-125 using, for example, GPS and/or other known location technologies. Examples of such other technologies include AOA, TDOA, location pattern matching and/or hybrids thereof. In alternative embodiments of the present invention, the location of a hard-wired device such as a hard-wired telephone may be determined based on the postal address assigned to the telephone number. Other embodiments of the present invention could include enhanced-911 (E-911) infrastructure or other locator technologies for determining the location of a particular mobile station. Devices and/or systems that provide location information including location coordinates for a mobile station are referred to herein as locator devices or systems.

In embodiments of the present invention, satellites 151-153 may be part of the GPS. These satellites 151-153 may be used to track and/or transmit the location of mobile stations 121-125, using known GPS methods. In this case, one or more of the mobile stations 121-125 may contain GPS transmitters. Typically, the satellites 151-153 can transmit location information to earth stations (not shown) coupled to the transit network 130. The earth stations may forward the location information to the group-tracking server 180.

Additionally or optionally, using known wireless location technologies mentioned above (e.g., AOA, TDOA, etc.), location information for mobile stations 121-125 may be determined based on the communication signals transmitted/received by a plurality of antennas 160-161 coupled to mobile switching office (MSO) 171-172. One or more of the mobile stations 121-125 may be digital, analog, PCS (personal communication systems) or any other type of wireless devices that exchange communication signals with antennas 160-161. These mobile stations 121-125 may use analog cellular, digital cellular, TDMA, CDMA, or other technologies to communicate with the MSOs 171-172. The MSO 171 or the like may be coupled to the transit network 130 and may communicate with group-tracking server 180 through the transit network 130. As used herein, MSO 171-172 may be, for example, any type of switch that can handle analog cellular, digital, personal communication services (PCS), or any other types of wireless calls. It is recognized that satellites may also be used to exchange communications signals between one or more mobile stations 121-125 and/or MSOs 171-172.

Mobile stations 121-125 can be any of a variety of communication devices such as wired or wireless telephones, one-way or two-way pagers, Personal Digital Assistants (PDAs) with appropriate communication hardware/software, personal computers (PCs), GPS transmitters/receivers, and/or any other devices that can be tracked or located. It is recognized that many devices, such as PDAs and PCs, can be configured with GPS transmitters/receivers that can be located and/or tracked in accordance with embodiments of the present invention. It is further recognized that GPS and/or wireless location technologies may be employed to track the locations of vehicles and/or any other means of transportation.

As shown, client terminal 110 is coupled to transit network 130 and can be used to transmit and receive information from the group-tracking server 180. The client terminal 110 may be owned and/or operated by a client who subscribes to the group tracking service described herein. The client terminal may be a PC, a PDA, and/or any other device that can be used to display and/or input information. The group-tracking server 180 can be used to transmit and/or receive information.

Although, for simplicity, only a limited number of satellites, MSO, mobile stations, antennas, etc. are shown in FIG. 1, it is understood that a typical system, in accordance with embodiments of the present invention, may include additional satellites, MSO, mobile stations, etc. Transit network 130 may include various types of switches and/or other communication devices that have not been shown for simplicity.

Transit network 130 may be a communications network that may include, for example, a public switched telephone network (PSTN), an Integrated Services Digital Network (ISDN), a cellular network, a digital mobile network, a Personal Communication Systems (PCS) network, an Internet, an intranet, a signaling system 7 (SS7) network, a local area network (LAN), a satellite network, an advanced intelligent network (AIN), any suitable digital or analog network, a broadband network such as cable, any other suitable national and/or international communications network or any suitable combination thereof.

Figure 2:
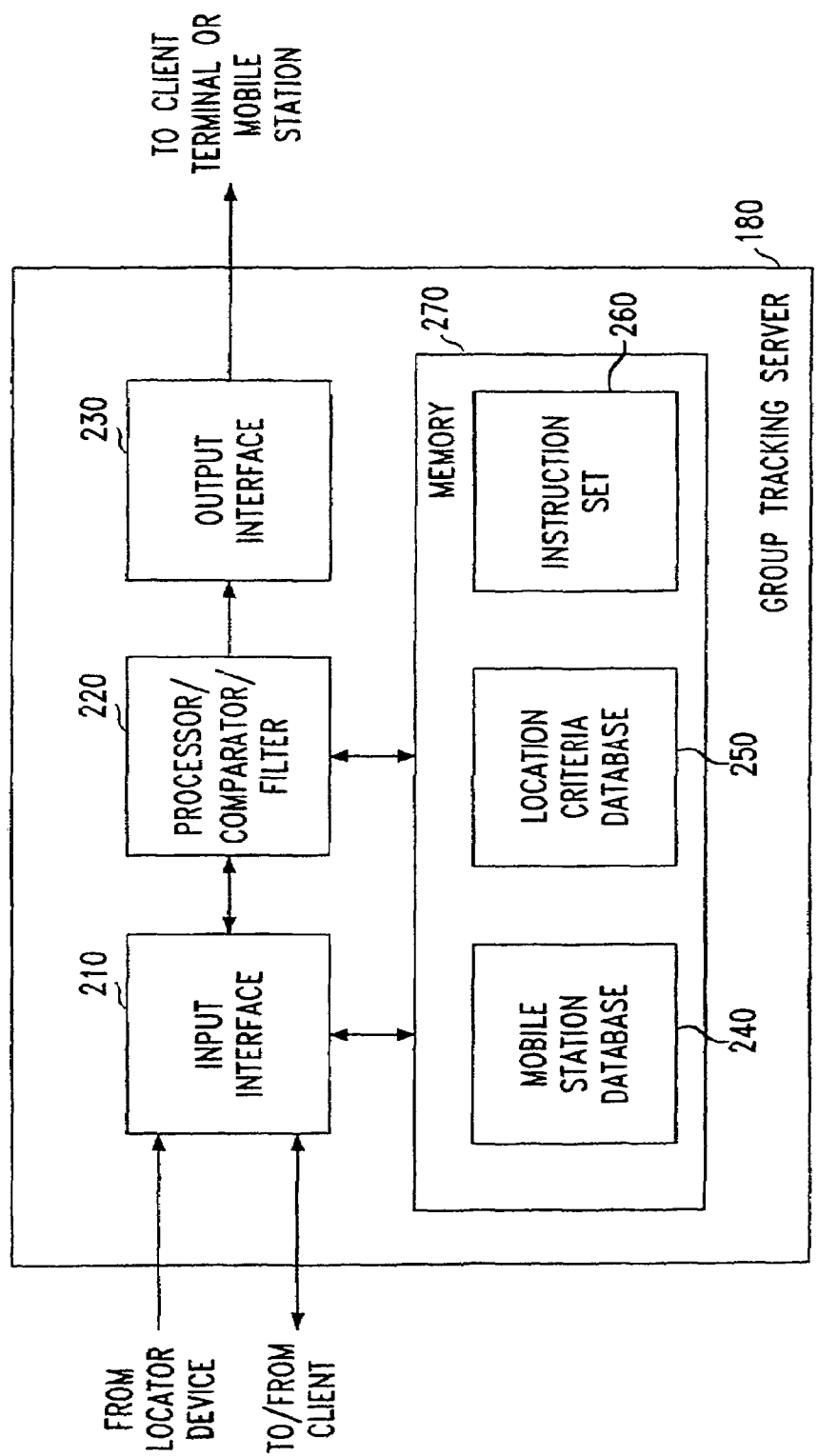
FIG. 2 illustrates a block diagram of a group-tracking device in accordance with an embodiment of the present invention.

FIG. 2 is a block diagram of group-tracking server 180 that may contain intelligence to track, maintain and/or process, in real time, the geographic locations of one or more mobile stations 121-125. The group-tracking server 180 may be, for example, a stand-alone device located outside of the transit network 130, or it may be located within another device within the transit network 130, or within a client's device used to track the location of a plurality of mobile stations 121-125. In alternative embodiments of the present invention, the group-tracking device may be located internal to one of the mobile stations 121-125. It is recognized that any suitable hardware and/or software may be used by one of ordinary skill in the art to configure and/or implement a group-tracking device and/or system in accordance with embodiments of the present invention.

The group-tracking server 180 may include, for example, an input interface 210, processor/comparator/filter 220, (hereinafter, a processor) memory 270 and output interface 230.

In embodiments of the present invention, the input interface 210 may receive inputs from locator devices (e.g., GPS systems, wireless location technologies, etc.), clients of the group-tracking service, and/or memory 270. The input interface 210 may populate memory 270 with information received from the locator device, clients, etc. Memory 270 may be, for example, a Random Access Memory (RAM) or other type of storage memory. The memory 270 may be populated with a plurality of databases, for example, a mobile station database 240, location criteria database 250, and/or a database including an instruction set 260. Of course, memory 270 may include other information and additional databases.

In embodiments of the present invention, the input interface 210 may receive identifiers for the users and/or their mobile stations. These identifiers can be used to track subscribers of the group-tracking service. In other words, each user to be tracked and/or the user's mobile station may have a pre-determined identifier or mobile number. Using her client terminal 110, a subscriber or client of the group-tracking service may send one or more mobile station identifiers, that the subscriber is interested in tracking, to the input interface 210 of the group-tracking server 180.

In embodiments of the present invention, the subscriber may predefine a group of mobile stations 121-125, identified by corresponding mobile station identifiers, that are to be tracked by the group-tracking server 180. In embodiments of the present invention, the mobile station identifiers may be stored in the mobile station database 240.

Additionally, the input interface 210 may receive location criteria for one or more pre-determined targets. The one or more pre-determined targets may be one or more of the mobile stations 121-125 in the predefined group. For example, the location criteria may represent an acceptable absolute and/or relative location range and/or distance that the subscriber may designate for the mobile stations 121-125 belonging to the pre-defined group. In other words, the subscriber may indicate, for example, that each of the identified mobile stations 121-125 in the predefined group should remain less than or equal to one (1) mile from each other and/or one (1) mile from a fixed location. The acceptable location range may be a fixed value such as one (1) mile or may be a range of values, for example, one (1) to two (2) miles, and/or any other distance or measurement consistent with the ability of the location detection technology (e.g. GPS) to track the user. It is recognized that the location criteria given above is given by way of example only and that other location criteria may be established for the one or more mobile stations 121-125 located in the pre-defined group of mobile stations 121-125. Other examples of location criteria will be described below in more detail.

Alternatively and/or additionally, the location criteria could be based on, for example, travel time. For example, the group-tracking server 180 may track a user, via her mobile station 122, as he/she moves through a particular area. The group-tracking server 180 may determine, based on the current location, traffic conditions, speed of the user, destination, etc., whether the user will be able to reach a pre-determined destination. If it is determined, based on current location, traffic conditions, etc., that the user will not be able to reach the pre-determined location based on the travel time, the user and/or subscriber may be so notified. In embodiments of the present invention, the group-tracking server may provide the user with alternative directions to reach the desired destination in the desired time frame.

The location criteria including acceptable location information of one or more mobile stations 121-125 may be received from the subscriber and may be stored in the location criteria database 250. The location criteria may include acceptable location information that may be measured relative to the predetermined targets. As indicated above, predetermined targets may be one or more mobile stations 121-125, and/or may be fixed locations or targets. Such fixed locations may include, for example, a particular street address, an intersection, a landmark, a restaurant, etc. As indicated above, the location criteria may also include the travel time required to reach a particular destination. The travel time can be dynamically calculated, as indicated above, or it may be previously calculated using fixed location points and stored in the location criteria database.

In embodiments of the present invention, it is recognized that geocoding may be used to determine the geographical location of the one or more mobile stations 121-125. As known, geocoding databases match address locations with a geographical location such as x coordinates and y coordinates that may represent longitude and latitude coordinates. These coordinates may be utilized by, for example, the GPS to map the geographical location of the one or more mobile stations 121-125. In embodiments of the present invention, the geo-coded location may be mapped to street addresses, intersections, locations of landmarks, etc. Once a location coordinate is received, a geo-coded database may be used to define a street address, intersection, or other useful geographic location information.

In embodiments of the present invention, processor/comparator 220 may receive geo-coded location coordinates for each mobile station for example, mobile station 123 in the predefined group of mobile stations 121-125 stored in the mobile station database 240. The processor 220 may be any type of general-purpose processor.

Based on the present location coordinates of a user, the processor 220 may calculate a relative distance between two or more predefined mobile stations 121-125 and/or a mobile station relative to a fixed location. The acceptable location criteria for the one or more mobile stations 121-125 may be stored in the location criteria database 250. The processor 220 may receive the location criteria from memory and compare the calculated relative distance for the mobile stations 121-125 in the predefined group of mobile stations 121-125 with the acceptable location criteria for the mobile stations 121-125 in the pre-defined group. In embodiments of the present invention, based on the comparison, the processor 220 may identify any mobile station 121-125 that is outside the acceptable location range. Using the output interface 230, the group-tracking server 180 may send a notification to the identified mobile station 121-125 and/or to the subscriber via client terminal 110.

In alternative embodiments of the present invention, the processor 220 may be configured to calculate a moving average location or a moving center for a group of mobile stations 121-125. The moving average location or moving center may be a center location that moves with the group of mobile stations 121-125. The processor 220 monitors each mobile station for example, mobile station 125 in the group of mobile stations 121-125, as they are moving as a convoy. If one or more of the mobile stations 121-125 stray away from the moving average location more than a pre-determined amount, the group-tracking server 180 may send a notification to the identified one or more mobile stations 121-125 and/or to the subscriber via client terminal 110. The identified one or more mobile stations 121-125 may be notified to change locations or speed to be in compliance with the moving average location.

In alternative embodiments of the present invention, the processor 220 may receive periodic location coordinates based on a predefined time interval for one or more mobile stations 121-125. For example, the processor 220 may receive location coordinates several times a second, every second, every 30 seconds, every minute, etc. Based on the periodic location coordinates, the processor may determine a travel time for the user of the mobile station to reach a predetermined destination. In one example, the processor may determine based on the current speed of the user, current traffic conditions, distance to destination, etc. whether the user will reach the predetermined destination. The predetermined destination may be set by the subscriber and stored in the location criteria database. In additional alternative embodiments, the processor 220 may monitor the group of mobile stations 121-125 to make sure that at least one of the mobile stations 121-125 is within a predetermined distance of a fixed location, moving average location and/or another mobile station.

In embodiments of the present invention, the subscriber may populate the instruction set 260 with instructions for handling mobile stations 121-125 that fall outside of the acceptable location criteria. For example, a subscriber may specify an instruction that if a mobile station 121 falls outside the acceptable location criteria, then the output interface 230 alerts the subscriber through the subscriber terminal 110. The subscriber may then notify the user of the mobile station 121 directly to correct its location so that the mobile station 121 can move within the acceptable location criteria.

In embodiments of the present invention, the group-tracking server 180 may direct the user of the mobile station—for example, mobile station 121—to a location that is within the acceptable location criteria. The group-tracking server 180 may provide detailed directions to the user to reach the predetermined location. In embodiments of the present invention, the directions may be presented via an audio device and/or a visual display. For example, the user may be presented with a map or other visual indicator indicating the recommended direction of travel. The visual indication may be accompanied with audio directions indicating the recommended direction of travel.

The mobile stations 121-125 in the predetermined group may be roaming in a fixed or movable area. Additionally or optionally, the subscriber may be notified if one or more of the mobile stations 121-125 in the subscriber's predefined group are determined to be outside the location criteria. It is recognized that additional instruction sets may be included in the instruction set 260. The instructions may be used to trigger an alert for the subscriber and/or the user of the mobile station if one or more of the mobile stations 121-125 is out of range of the location criteria. Additionally or optionally, an instruction may be employed to notify the user of the mobile station to perform a certain action—for example, change current location coordinates, take alternate route to destination, increase and/or decrease speed, etc. Action instructions to perform such actions may be included in the instruction set 260 and/or may be dynamically established by the group-tracking server 180 based on current conditions (e.g., current location, current traffic patterns, current traffic conditions).

In one example, the processor 220 may dynamically determine the direction and/or the distance the user of the mobile station should travel so that her location is within the acceptable location criteria. In other words, if processor 220 determines that the mobile station 122 is outside the acceptable location criteria selected for its predetermined group of mobile stations 121-125, the processor 220 may determine that the mobile station 122 can, for example, travel in the North-Easterly direction for one (1) mile to be within the acceptable location criteria. Optionally or additionally, group-tracking device 180 may provide more detailed directions to the user of the mobile station 122 so that the mobile station 122 can be in compliance with the location criteria. The processor 220 may provide such information to the user's mobile station 122 via the output interface 230.

In embodiments of the invention, the subscriber may receive information from group-tracking server 180 to monitor one or mobile stations 121-125 using the client terminal 110. The subscriber may be alerted when one or more mobile stations 121-125 are determined to be outside the acceptable location criteria. The subscriber may contact each such user using terminal device 110. The subscriber may send the appropriate instructions to the user to correct her present coordinates to be within an acceptable location criteria relative to other mobile stations 121-125 and/or a fixed location.

Embodiments of the present invention may have a plurality of different applications. For example, authorities may use embodiments of the invention to confirm that law enforcement officers currently provide sufficient coverage in a particular area of interest. In one example, a subscriber who may be police dispatcher may have the responsibility to make sure that a particular area and/or neighborhood has sufficient police officers on patrol. The group-tracking server 180 may monitor whether the mobile stations 121-125 are close enough within a certain distance or within a certain travel time of a fixed location, moving average and/or another mobile station.

Using client terminal 110, the subscriber may define the area of interest based on, for example, a plurality of geocoded locations, a plurality of street intersections, a predefined distance from a landmark, etc. For example, the subscriber may define an area of interest having approximately a one (1) mile radius around the White House. Additionally, the subscriber may define a maximum distance between police officers in the area of interest. For example, the subscriber may define that no more than a thousand feet (1000 ft.) of separation should exist between officers in the area of interest. Of course, the subscriber can include a range for the maximum distance, such as eight hundred (800) feet to twelve hundred (1200) feet, again consistent with the accuracy of the particular locating technology that is employed.

Additionally or optionally, the subscriber may define a minimum distance between police officers in the area of interest. For example, the subscriber may define that no officer should be closer than six hundred (600) feet from another officer being tracked in the area of interest, in accordance with embodiments of the present invention. Again, the subscriber can include a range for the minimum distance, such as six hundred (600) feet to eight hundred (800) feet. Accordingly, the minimum and maximum distance described above may be used to make sure that an area of interest is being sufficiently monitored by the appropriate authorities.

It is recognized that multiple classes of entities such as taxi cabs, fire fighters, security guards, sales people, etc. can be tracked simultaneously or separately, in accordance with embodiments of the present invention, to ensure that they are sufficiently covering a predefined area. It is recognized that the group-tracking server 180 may track a plurality of different entities at one time. The group-tracking server 180 may track, for example, taxi cabs to make sure that there is a taxi cab covering every block, fire fighters to make sure that there is a fire fighter on every block, or security guards to make sure there is a security guard within a thousand (1000) feet of each store. It is further recognized that mobile station identifiers, included in the predefined group of mobile stations 121-125 being tracked by the group-tracking server 180, may be stored in mobile station database 240. The predefined area of interest, the maximum and minimum distances, or other information related to the location criteria may be stored in the location criteria database.

In embodiments of the present invention, as the users and/or mobile stations 121-125 being tracked move through the area of interest, the group-tracking server 180 may monitor their location coordinates. If one or more of the users move outside the area of interest, move too close to or too far from other users in the predefined group, or violate any other location criteria, the user(s) may be alerted by the group-tracking server 180. In embodiments of the invention, the group-tracking server 180 may notify the user of any such violation and may instruct the user to move back to the proper location via their respective mobile stations 121-125. Such instructions may be stored in the instruction set 260. Additionally and/or optionally, the group-tracking server 180 may also notify the subscriber when one or more mobile stations 121-125 being tracked are in violation of a location criteria via the client terminal 110.

In an initialization step, a subscriber may access a group-tracking server 180 via client terminal 110. The subscriber may identify the group of mobile stations 121-125 and/or users that the subscriber desires to track. Additionally, the subscriber may also identify an area of interest, the maximum and/or minimum distances, the scheduled date and/or time when tracking should begin, and/or any other information that may be useful for tracking the desired mobile station. In an embodiment of the present invention, the group-tracking server 180 may store such information in corresponding databases located in memory 270. Prior to and/or on the scheduled date, the processor 220, under program control, may retrieve the identifiers for mobile stations 121-125 to be tracked from mobile station database 240. Additionally, the processor 220 may receive the location coordinates for the identified mobile stations 121-125 from locator devices via input interface 210. The input interface 210 may populate the memory 270 with the received information. The processor 220 may have access to contents of memory 270 via a system bus (not shown). As shown, the contents of memory 270 include, for example, the mobile station database 240, the location criteria database 250 and the instruction set 260.

In embodiments of the present invention, the processor 220 may receive all of the information from memory 270 and may process the information so that the mobile stations 121-125 in the predefined group can be tracked. Prior to and/or on the scheduled date and/or time for tracking, the processor may determine the present location of each mobile station in the predefined group of mobile stations 121-125. It is recognized that the subscriber can define more than one group to be tracked. The processor 220 may determine whether each mobile station is within the identified area of interest and/or if the mobile stations 121-125 adhere to the preset minimum and/or maximum distances. The processor 220 may identify any mobile station that falls outside of the identified area of interest and/or is in violation of the preset minimum and/or maximum distances. The processor 220 may determine a travel time that the users may have to reach a location so that their corresponding mobile stations 121-125 will be in compliance. The user determined to be furthest from the predetermined location may have the longest time to travel to that location. The user(s) determined to be in violation may be given directions, via the output interface 230, to the predetermined location so that they will be in compliance.

After all of the users are at their proper positions, the group-tracking server 180 may continue to monitor their respective mobile stations 121-125 to make sure that the users stay within the specified areas of interest and within the predefined maximum and/or minimum distances. The group-tracking server 180 may monitor the users so that they do not get too close and/or too far from one another as they are patrolling the predefined area.

In a further alternative embodiment of the present invention, the subscriber may desire to be alerted if one or more of the mobile stations 121-125 comes too close to another. In this case the user of such a mobile station may be alerted to move to a new coordinate in order to be in compliance. In this case, the subscriber may be alerted when the one or more mobile stations 121-125 moves within the pre-specified distance and/or range. If any user goes outside the predetermined location and/or violates a maximum and/or minimum distance, she may be alerted to be in compliance. It is recognized that different groups of users may be simultaneously tracked so that a user from each group is present at a particular location. For example, police officers, firefighters, security guards, medical personnel, etc. may be tracked at the same time so that a member of each group is present at the predetermined location.

Embodiments of the present invention may be used to enforce a protective order so that the person under protection does not get too close (e.g., in distance and/or time of travel) to the individual against whom the order is sought. In another example, the invention maybe used to monitor offenders so that they are allowed to go, for example, back and forth from work with only slight detours. Additionally or optionally, individuals may be reminded to take certain action such as, e.g., take or pickup medication, pickup the groceries, the laundry, get gasoline, etc. when they in proximity (e.g., in time and/or distance) of a pre-defined location (e.g., medicine cabinet, pharmacy, grocery store, dry cleaner, etc.).

In further embodiments of the invention, other actions such as a conference call may be set up automatically when a group of users are, for example, within a predefined distance or travel time of each other. Additionally, the output interface 230 may offer dialogs to users via their mobile stations 121-125 to direct them to a predefined location.

FIG. 3 is a flowchart illustrating an exemplary manner in which a group-tracking service may operate in accordance with an embodiment of the present invention. A subscriber may subscribe to a group-tracking service and may access the group-tracking server 180 using network 130 via subscriber terminal 110. The subscriber may incur a one-time and/or a recurring fee for her group-tracking service subscription.

In embodiments of the present invention, the subscriber may access a web site offered by the group-tracking service. The subscriber may enter her assigned user identifier and/or password to access the group-tracking service web site.

Initially, the user may be presented with an introduction and may be invited to create a list of users or mobile stations 121-125 that the subscriber desires to track in accordance with embodiments of the present invention. The subscriber may create a group list including names of users by their names or by their mobile station identification numbers for tracking and/or monitoring purposes. In embodiments, the user may enter the name and/or the mobile station identification number for each user she desires to track. The system may confirm that the identified user exists in the system and can be tracked by the group-tracking service. Alternatively, the subscriber may create a group-tracking list from a list of available users and/or mobile stations 121-125 offered by the group-tracking service. The group-tracking server 180 may have such list of available users stored in the mobile station database 240.

In embodiments of the present invention, after the subscriber has created a group list of mobile stations 121-125 to track, the subscriber may store the group list in the mobile station database 240. The subscriber may retrieve the stored group list at any time to, for example, modify, update and/or edit. It is recognized that a subscriber may create more than one group lists of mobile stations 121-125 that the subscriber wants to track.

In embodiments of the present invention, the subscriber may further designate a location criteria for the group of mobile stations 121-125 the subscriber desires to track. The location criteria may be used by the group-tracking service to, for example, monitor the movements of the mobile stations 121-125 identified in the group list and to alert the subscriber and/or the users if one or more of the mobile stations 121-125 violate the location criteria. For example, the location criteria may include the predetermined area of interest, maximum and/or minimum distance and/or range each mobile station may be separated relative to another mobile station. The group-tracking service may monitor the movements of the mobile stations 121-125 included in the subscriber's group list and may use the location criteria to verify that the mobile stations 121-125 do not stray too far from one another and/or from a pre-determined target such as another mobile station or a fixed location coordinate. As indicated above, the location criteria may also include a minimum distance that each mobile station can be relative to each other and/or a fixed point so that mobile stations 121-125 do not come too close together.

The location criteria may further include, for example, date and/or time for monitoring the group of mobile stations 121-125 identified in the subscriber's list.

In step 3000, in an exemplary embodiment of the present invention, the group-tracking server 180 receives tracking information including a group list of user and/or mobile stations 121-125 to track. The group list may be received directly from the subscriber and/or may have been previously created and stored in the mobile station database 240 by the subscriber. The group-tracking server 180 may retrieve the location criteria to determine the area of interest designated by the subscriber. In embodiments of the present invention, the group-tracking server 180 may further retrieve any maximum and/or minimum distance restrictions and/or any date and/or time instructions that the subscriber may have indicated for triggering the group-tracking service. Periodically, the processor 220 may retrieve the location information and/or any other information, for each mobile station identified in the subscriber's group list, stored in the various databases 240-260 of memory 270. The location information may include current location coordinates for each mobile station. Based on the received location information, the processor 220 may determine whether the mobile stations 121-125 included in the group list are within an area of interest designated by the subscriber. In one example, if the processor 220 determines that the mobile stations 121-125 included in the group list are not within the area of interest, then the group-tracking server 180 may continue to monitor the mobile stations 121-125 until the mobile stations 121-125 are within the area of interest.

If the processor 220 determines that the mobile stations 121-125 included in the group list are within the area of interest, then the group-tracking device may begin to track the mobile stations 121-125 included in the subscriber's group list.

In embodiments of the present invention, prior to starting the tracking process, the processor may determine whether the current date and/or time (e.g., the date and/or time when the mobile stations 121-125 are within the area of interest) matches with any date and/or time instructions that the subscriber may have indicated for triggering the group-tracking service. If the current date and/or time matches with the date and/or time instructions, then the group-tracking device may begin to track the mobile stations 121-125 included in the subscriber's group list. If, however, the current date and/or time does not match with the date and/or time instructions, then the group-tracking device may suspend the group-tracking process until the mobile stations 121-125 are determined to be in the area of interest at the pre-determined date and/or time. In alternative embodiments of the present invention, the group-tracking process may be activated during the times specified by the subscriber.

In embodiments of the present invention, if the group-tracking service is triggered, the group-tracking server 180 receives current location coordinates for each mobile station in the group list from a locator device, as shown in step 3010. The one or more predetermined targets may be other mobile stations 121-125 in the predetermined group list, landmark(s), work zones, street names, intersections, etc. If the predetermined targets are other mobile stations, the location coordinates are received in step 3010. If the predetermined target is, for example, a street address, a landmark, etc., the location coordinates for such a target may be received from, for example, a geo-coded database (not shown). In this case, the subscriber may provide the physical or geographic address for the target and the geo-coded database may be used to determine the location coordinates for the target.

Based on the current location coordinates for each mobile station and/or predetermined target, the processor 220 calculates a relative location of each mobile station relative to the one or more predetermined targets, as shown in step 3020. As shown in step 3030, the processor 220 retrieves the acceptable location criteria for the predetermined one or more targets. As shown in step 3040, the processor 220 compares the calculated relative location of each mobile station relative to the one or more pre-determined targets with the retrieved location criteria. Subsequently, the processor 220 determines whether the relative location of each mobile station, relative to the one or more pre-determined targets, is in compliance with the acceptable location criteria, as shown in step 3050. If it is, a notification is sent to the subscriber indicating that the relative location is in compliance with the acceptable location criteria, as shown in step 3060.

In embodiments of the present invention, as shown in step 3070, the subscriber is alerted if it is determined that the relative location of one or more mobile stations 121-125, relative to the one or more pre-determined targets, is not in compliance with the acceptable location criteria. As shown in step 3080, the group-tracking device 180 continues to track the location of the mobile stations and informs the users of the mobile stations when they are in compliance. As indicated above, the group-tracking device may provide detailed directions to the mobile stations 121-125 so that the mobile stations 121-125 will be in compliance with the location criteria.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A memory medium containing machine readable instructions which, when executed by a processor, enable a computer to determine whether each mobile station in a pre-defined group is in compliance with an acceptable location criteria by:
   receiving mobile station tracking information including a mobile station identifier for each mobile station in the pre-defined group;
   receiving current location coordinates corresponding to the mobile station identifier for each mobile station from a locator device;
   calculating a relative location of each mobile station relative to at least one pre-determined target;
   retrieving the acceptable location criteria for each mobile station relative to the one pre-determined target from a location criteria database;
   comparing the calculated relative location of each mobile station relative to the one pre-determined target, with the retrieved location criteria to determine whether the calculated relative location is in compliance with the acceptable location criteria; and
   notifying a subscriber if the calculated relative location is in compliance with the acceptable location criteria; and
   alerting the subscriber for each mobile station whose calculated relative location is not in compliance with the acceptable location criteria.

2. The memory medium of claim 1, wherein the one pre-determined target is another mobile station.

3. The memory medium of claim 1, wherein the one pre-determined target is a fixed location coordinate.

4. The memory medium of claim 1, wherein the machine readable instructions, when executed by the processor, further enable the computer to:
   identify at least one mobile station having the calculated relative location that is not in compliance with the location criteria; and
   alert a user of the identified at least one mobile station that the calculated relative location of the at least one mobile station is outside an area of interest.

5. The memory medium of claim 4, wherein the machine readable instructions, when executed by the processor, further enable the computer to:
   alert the user of the identified one mobile station that the calculated relative location of the one mobile station exceeds a maximum distance requirement relative to another mobile station.

6. The memory medium of claim 1, wherein the machine readable instructions, when executed by the processor, further enable the computer to:
   determine updated location coordinates for each mobile station that is not in compliance with the acceptable location criteria, wherein the updated relative location based on the updated location coordinates will make the mobile station comply with the acceptable location criteria; and
   transmit the updated location coordinates to a user of the mobile station.

7. The memory medium of claim 6, comprising wherein the machine readable instructions, when executed by the processor, further enable the computer to:
   provide detailed directions to the user for relocating to the updated location coordinates.

8. The memory medium of claim 7, comprising wherein the machine readable instructions, when executed by the processor, further enable the computer to:

monitor the user's mobile station to confirm whether the user relocates to the updated location coordinates.

9. The memory medium of claim 1, wherein the acceptable location criteria is based on distance.

10. The memory medium of claim 1, wherein the acceptable location criteria is based on travel time.

11. A memory medium containing machine readable instructions which, when executed by a processor, enable a computer to determine whether each mobile station in a pre-defined group is in compliance with an acceptable location criteria, by:

receiving mobile station tracking information including a mobile station identifier for each mobile station in the pre-defined group;

receiving current location coordinates corresponding to the mobile station identifier for each mobile station from a locator device;

calculating a relative location of each mobile station relative to at least one pre-determined target;

retrieving the acceptable location criteria for each mobile station relative to the one pre-determined target from a location criteria database;

comparing the calculated relative location of each mobile station relative to the one pre-determined target, with the retrieved location criteria to determine whether the calculated relative location is in compliance with the acceptable location criteria;

notifying a subscriber if the calculated relative location is in compliance with the acceptable location criteria;

identifying at least one mobile station having the calculated relative location that is not in compliance with the location criteria;

alerting a user of the identified at least one mobile station that the calculated relative location of the at least one mobile station is outside an area of interest; and alerting the user of the identified at least one mobile station that the calculated relative location of the one mobile station is less than a minimum distance requirement relative to another mobile station.

12. A memory medium containing machine readable instructions which, when executed by a processor, enable a computer to monitor a relative geographical location for a plurality of mobile stations identified in a pre-defined group by:

identifying a present geographical location for each of the mobile stations identified in the pre-defined group;

retrieving location criteria information for the plurality of mobile stations identified in the pre-defined group, the location criteria information indicating acceptable geographic proximity criteria for each mobile station relative to one or more pre-determined targets;

comparing the identified present geographical location for each mobile station relative to one or more pre-determined targets with the retrieved location criteria information for each mobile station identified in the pre-defined group to determine whether the present geographic location is within acceptable limits of the location criteria; and outputting an alert indication to an output terminal for each one of the plurality of mobile stations whose present geographic location relative to the one or more pre-determined targets is not within acceptable limits of the location criteria.

13. The memory medium of claim 12, wherein the one or more pre-determined targets is at least one other mobile station.

14. The memory medium of claim 12, wherein the pre-determined target has fixed location coordinates.

* * * * *